(12) United States Patent
Krischer

(10) Patent No.: US 8,430,236 B2
(45) Date of Patent: Apr. 30, 2013

(54) CHAIN TRANSPORTER SYSTEM

(75) Inventor: Achim Krischer, Wipperfrüth (DE)

(73) Assignee: Bühler Bindler GmbH, Bergneustadt (DE)

(*) Notice: Subject to any disclaimer, the term of this patent is extended or adjusted under 35 U.S.C. 154(b) by 0 days.

(21) Appl. No.: 12/931,523

(22) Filed: Feb. 3, 2011

(65) Prior Publication Data

US 2011/0127144 A1    Jun. 2, 2011

Related U.S. Application Data

(63) Continuation of application No. 10/483,129, filed on Jul. 22, 2004, now Pat. No. 8,016,103.

(30) Foreign Application Priority Data

Aug. 20, 2001 (DE) .................. 101 39 372
May 28, 2002 (WO) ................. PCT/DE02/01962

(51) Int. Cl.
*B65G 17/00* (2006.01)
*B65G 15/42* (2006.01)

(52) U.S. Cl.
USPC .......................... 198/853; 198/699.1

(58) Field of Classification Search .......... 198/690.2, 198/822, 698, 699.1, 853, 818
See application file for complete search history.

(56) References Cited

U.S. PATENT DOCUMENTS

| | | | | | |
|---|---|---|---|---|---|
| 4,832,183 | A | * | 5/1989 | Lapeyre | 198/699 |
| 5,000,311 | A | * | 3/1991 | Abbestam et al. | 198/867.14 |
| 5,137,144 | A | * | 8/1992 | Uehara | 198/822 |
| 6,321,904 | B1 | * | 11/2001 | Mitchell | 198/867.11 |
| 6,695,135 | B1 | * | 2/2004 | Lapeyre | 198/853 |
| 8,016,103 | B2 | * | 9/2011 | Krischer | 198/853 |

* cited by examiner

*Primary Examiner* — Mark A Deuble
(74) *Attorney, Agent, or Firm* — Francis C. Hand; Carella, Byrne, et al.

(57) ABSTRACT

A chain transporter system has a plurality of adapter elements mounted on spaced apart chain links with a separate mounting part received in each adapter element. Each adapter element includes a groove-type recess having a pair of opposed walls, each of which has an undercut. Each mounting part is received in the recess of an adapter element with extensions matingly received in the undercuts of the adapter element.

12 Claims, 5 Drawing Sheets

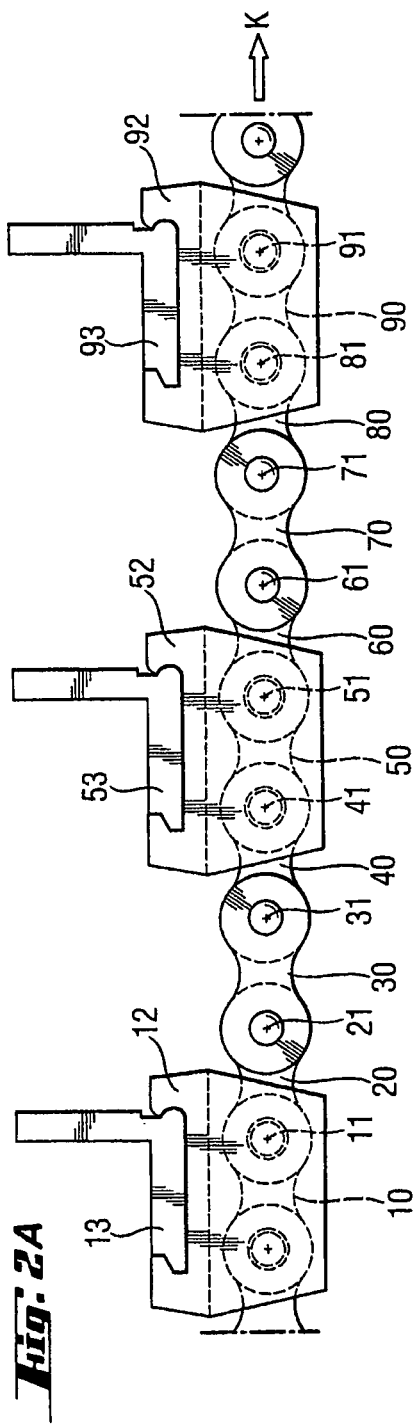
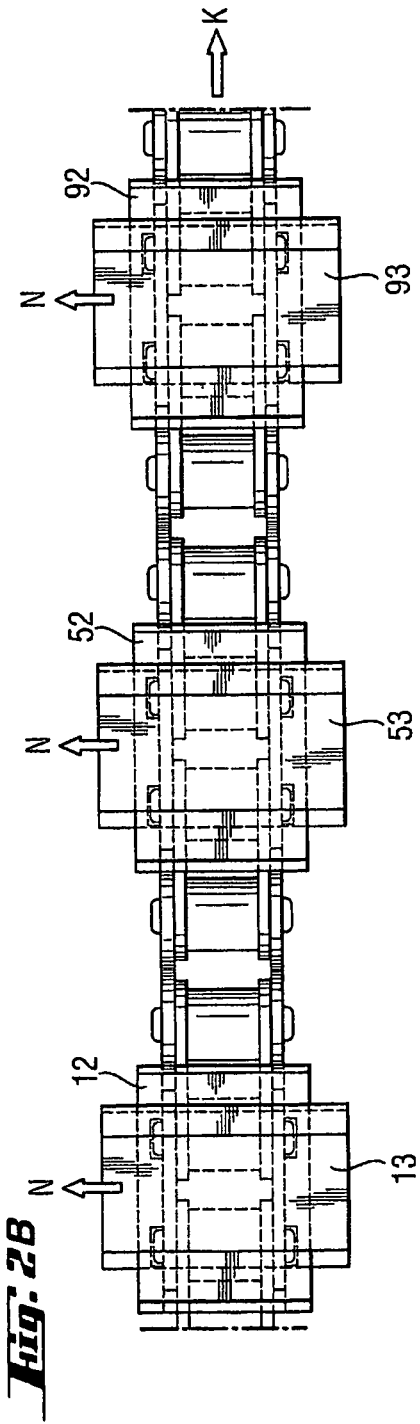

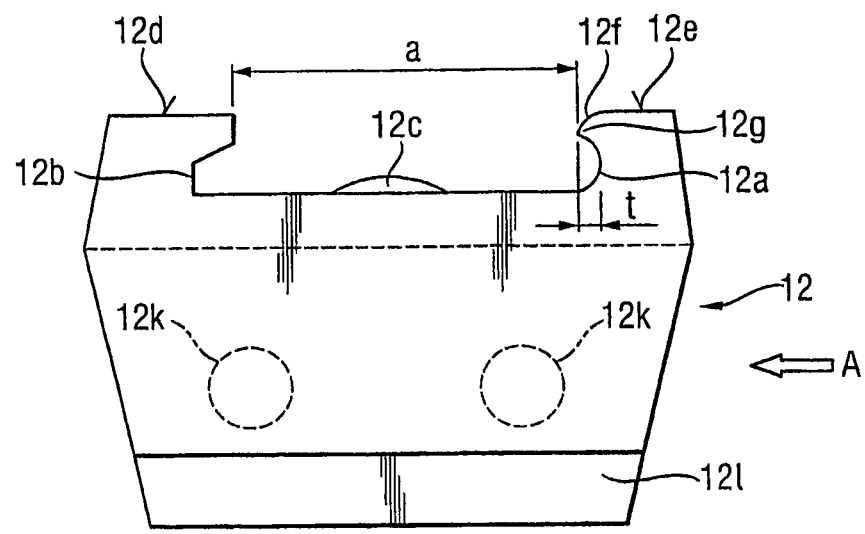
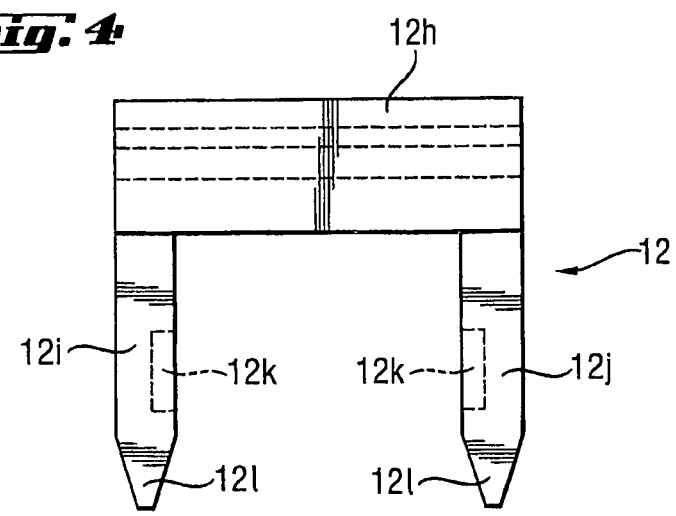

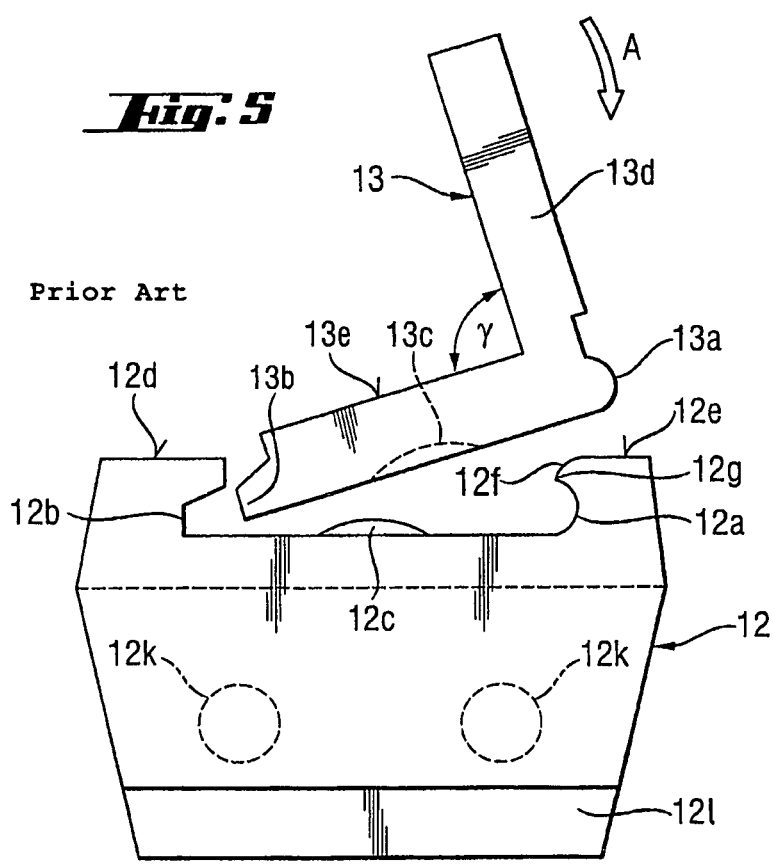

CHAIN TRANSPORTER SYSTEM

This is a continuation of Ser. No. 10/483,129, filed Jul. 22, 2004, now U.S. Pat. No. 8,016,103 issued Sep. 13, 2011.

This invention relates to a chain transporter system with mounting parts.

Chain transporter systems having specially conformed mounting parts are used in industry in many production processes. Such a system is used particularly with vertical chain transporters for shells filled with chocolate or similar fillings. The specially designed mounting parts may be, for example, angle elements made from aluminum that are attached to selected chain links of a roller chain.

FIGS. 1A and 1B show a known system for attaching mounting parts to a transporter chain, particularly for attaching aluminum angle elements 13', 53', 93' to selected chain links 10, 50, 90 of a transporter chain. In this arrangement, aluminum angle elements 13' are screwed to the roller chain, i.e. to link plates 12a' and 12b' on either side thereof using countersunk screws 16, 17. For the screwed connection of angle elements 13', 53', 93', these had to be marked, drilled and then countersunk at each screwing position. These processing steps are very time consuming and thus also costly.

The object was therefore defined to provide a system of attaching mounting parts to a transporter chain, particularly for securing aluminum angle elements to a roller chain, which permits the rapid and thus cost-saving attachment of the mounting parts to the chain links of a transporter chain.

Briefly, the invention is directed a chain transporter system comprised of a plurality of sequentially arranged chain links, a plurality of adapter elements and a plurality of mounting parts.

Each adapter element is mounted on a respective one of the chain links and includes a groove-type recess in an upper part thereof having a pair of opposed walls, a first undercut in one of the walls and a second undercut in the other of the walls.

Each mounting part is received in the recess of a respective one of said adapter elements and includes a first extension matingly received in the first undercut of the adapter element and a second extension matingly received in the second undercut of the adapter element.

The chain transporter system according to the invention includes specially adapted chain links and link pins, wherein a positive connection is enabled between a connection area of the mounting part and a connection area of the adapted chain link and link pin.

The system according to the invention for securing mounting parts to a transporter chain uses specially conformed adapter elements, by means of which the respective mounting parts are attached to the respective selected chain link.

Further advantages, features and application possibilities of the invention will become evident from the following description of a particularly preferred embodiment of the invention, in which:

FIG. 2A is a side view of the chain transporter system according to the invention;

FIG. 2B is a plan view of the chain transporter system of FIG. 2A;

FIG. 3 is a side view of the adapter element according to the invention;

FIG. 4 is a front view of the adapter element according to the invention of FIG. 3 in the direction of arrow A;

FIG. 5 is a side view showing the attachment according to the invention of the adapter element to the mounting part.

Figure 1A:
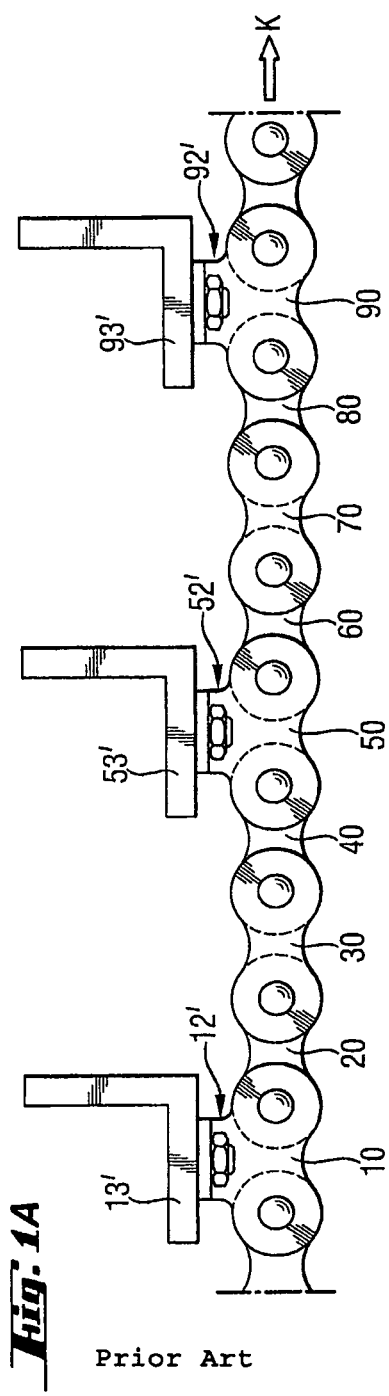
FIG. 1A is a side view of a known chain transporter system.

FIG. 1A shows a section of a conventional transporter chain with chain links 10, 20, 30, 90, which extend along a chain's longitudinal direction K. Some selected chain links 10, 50, 90 from the chain section represented are furnished with adapter elements 12', 52' and 92', to each of which a mounting part 13', 53' and 93' is attached.

Figure 1B:
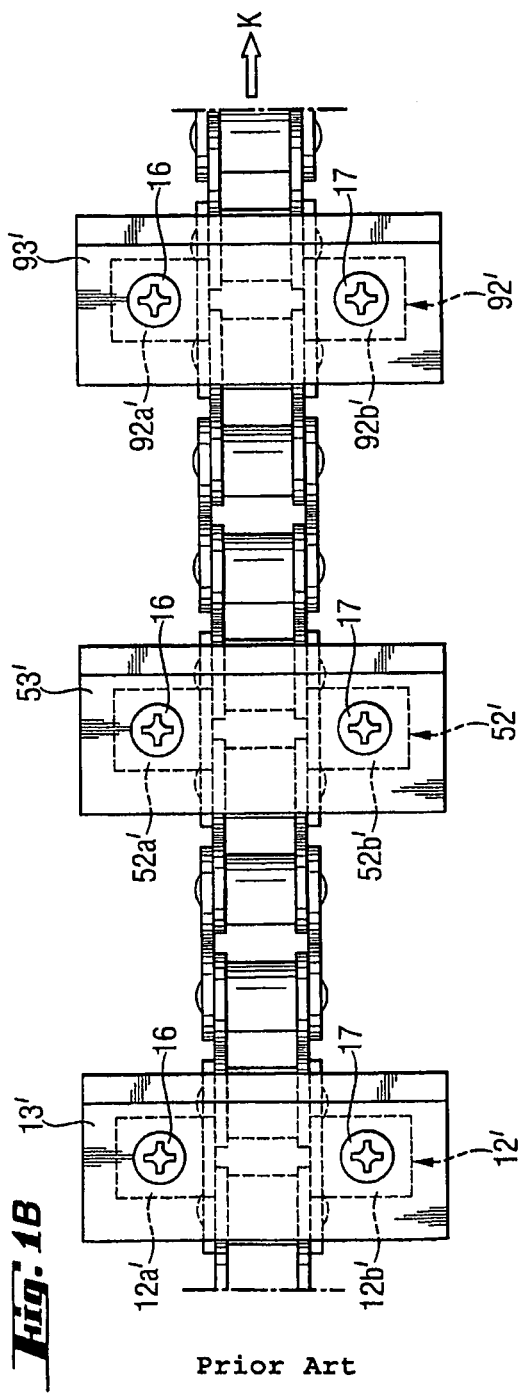
FIG. 1B is a plan view of the known chain transporter system of FIG. 1.

FIG. 1B shows a plan view of the chain section of FIG. 1A. Adapter elements 12', 52' and 92' of selected chain links 10, 50 and 90 are each furnished with a pair of link plates 12a', 12b', 52a', 52b'. and 92a', 92b', which extend away from the transporter chain on either side thereof. Each of mounting parts 13', 53' and 93' (FIG. 1A), is secured to the corresponding adapter element 12', 52' and 92' using countersunk screws 16 and 17.

FIG. 2A is a side view of a section of the chain transporter system according to the invention, equipped with the system according to the invention for securing mounting parts to the transporter chain. The section shown includes contiguous and interconnected chain links 10, 20, 30, . . . , 90, wherein for example chain links 10, 50 and 90 are specially conformed chain links in that they are connected to an adapter element 12, 52 and 92. The chain is preferably constructed with extended pins in its entirety, i.e. on all chain links, so that the adapter element may be inserted at any position. Adapter element 12, 52 and 92 is attached to the associated chain link 10, 50 and 90 via a latching or clamping connection (see FIG. 6). The corresponding mounting part 13, 53 and 93 is also attached to the corresponding adapter element 12, 52 and 92 via a latching or clamping connection (see FIG. 5), wherein a connection area of each mounting part 13, 53, 93 engages both positively and negatively with a connection area conformed as a counterpart recess of corresponding adapter element 12, 52 and 92.

FIG. 2B is a plan view the section of the transporter chain of FIG. 2A. The three mounting parts 13, 53 and 93 shown, which are fitted into the corresponding recess of the respective adapter element 12, 52 and 92 with both and negative engagement, are aluminum angle elements. The material from which adapter elements 12, 52 and 92 are made is preferably an elastic plastic. It is important that the material of the adapter element is elastically deformable when mounting parts 13, 53 and 93 are pressed into the respective adapter elements 12, 52 and 92, so that above a given pressure point the mounting parts can be pressed into the recess of the adapter element, whereupon the positively and negatively engaged connection is created between mounting parts 13, 53 and 93 and the corresponding adapter elements 12, 52 and 92. The same material deformation of adapter elements 12, and 92 is also essential for producing the positively and negatively engaged connection between chain links 10, 50 and 90 and the corresponding adapter elements 12, 52 and 92.

FIG. 3 is a side view of the adapter element 12 according to the invention. It serves as an adapter between a selected chain link 10 and a mounting part 13 to be attached to chain link 10. The upper area of adapter element 12 is attachment area 12a, 12b, 12c, which is conformed as a recess to accommodate the corresponding counterpart attachment area of mounting part 13 (FIG. 5).

The attachment area is a groove-type recess in the upper part of adapter element 12, wherein the groove has a clearance 'a'. On one wall of the groove is an undercut 12a, which is conformed as a concave rounding having undercut depth 't'. In the middle of the floor of the recess is a prominence 12c, and on the other wall of the groove is an undercut 12b opposite to undercut 12a. Similarly, a borehole may also be provided, which serves to accommodate a stop boss in mounting part 13. Surfaces 12d and 12e on both sides of the recess lie on the same plane. The surface above undercut 12a is furnished with a convex rounding 12f. A transition area 12g is configured between the concave rounding serving as undercut 12a and the convex rounding 12f, which transition area protrudes farthest into the groove. Adapter element 12 further includes recesses and boreholes 12k, which are provided on the inside of legs 12i and 12j (FIG. 4, FIG. 6) of adapter element 12.

FIG. 4 is a view of adapter element 12 of FIG. 3 along arrow A. The cross-section of adapter element 12 perpendicular to direction A is essentially U-shaped with a crosspiece 12a and two legs 12i and 12j, which extend parallel to each other and perpendicularly to the crosspiece 12a. The two recesses or holes 12k on the insides of legs 12i and 12j in the positive locking engagement with the corresponding selected chain link 10 (see FIG. 6).

Figure 6:
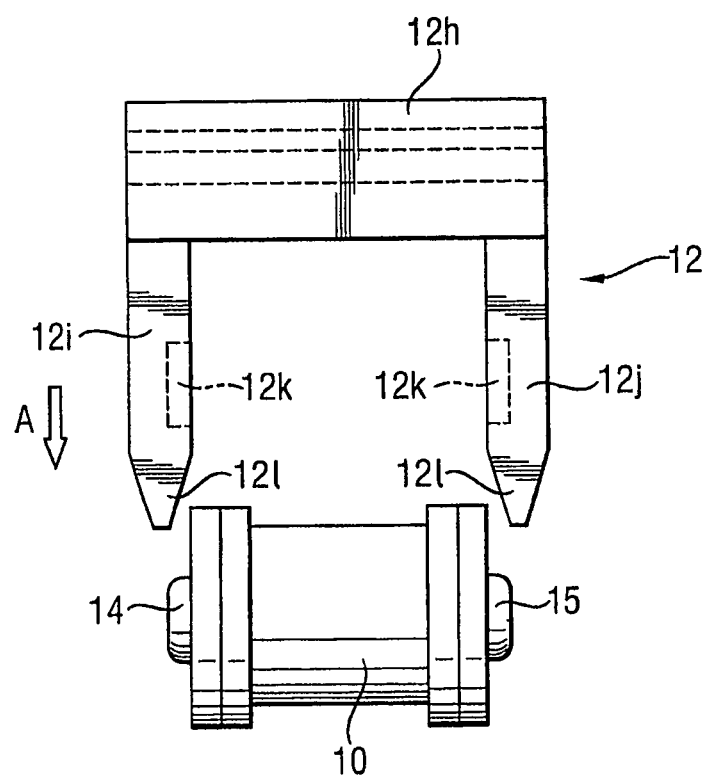
FIG. 6 is a front view showing the attachment according to the invention of a selected chain link to the adapter element according to the invention.

FIGS. 5 and 6 show the process of connecting a mounting part 13 according to the invention with an adapter element 12 according to the invention and thus also to a chain link 10 fitted with the adapter element 12 according to the invention.

FIG. 5 shows the mounting part 13 according to the invention, which includes a first angled leg with a first extension 13a, a second extension 13b and a depression 13c, and a second angled leg 13d. Instead of depression 13c, a stop boss may also be provided. Angle y between the first angled leg and the second angled leg is 90°. If the first angled leg of mounting part 13 according to the invention is now twisted from above into the recess in adapter element 12 as indicated by arrow A, convex rounding 13a of mounting part 13 slides along convex rounding 12f of the adapter element, which causes increasing elastic deformation of adapter element 12.

It is crucial that clearance 'a' (see FIG. 3) in the groove-type depression of adapter element 12 is flared progressively, such that the contact point with convex rounding 13a of mounting part 13 is displaced downward as mounting parts 13, 53 and 93 are pushed into respective adapter elements 12, 52 and 92, so that the mounting parts may be pressed into the recess of the adapter elements above a given pressure point.

The groove is flared because convex rounding 13a of mounting part 13 slides along convex rounding 12f of adapter element 12 as mounting part 13 is pressed into adapter element 12, and the line of contact between convex rounding 13a and convex rounding 12f is displaced downwards until it is located in transition area 12g between convex rounding 12f and concave rounding 12a of adapter element 12. Now the maximum pressure point has been reached. With further insertion pressure the elastically flared groove snaps together above extensions 13a and 13b, which causes mounting part 13 to be slid into the positively locking position by the elastic potential energy. For an especially secure positive lock between mounting part 13 and adapter element 12, it is particularly important that mounting part 13 have a much greater modulus of elasticity than the adapter element 12 designed to accommodate it. In other words, mounting part 13 should be essentially rigid for all practical purposes, whereas the reception part is less rigid and more easily elastically deformable. Then as soon as the rigid mounting part 13 is locked into the recess of the adapter element 12, the elastic deformation thereof is prevented due to blocking by the floor surface of the groove-type recess in the adapter element, and consequently much greater force is required to disengage the mounting part from adapter element 12 than the pressure used to insert it. In order to prevent mounting part 13 from slipping sideways out of the groove in adapter element 12, a projection 12c is provided on the floor of the groove and is engaged in a counterpart depression 13c on the first angled leg of mounting part 13. Instead of the projection 12c, a hole may also be provided with which a boss stop may create a positive locking arrangement.

The recess in adapter element 12 designed to seat the first angled leg is preferably constructed somewhat smaller than the precise counterpart form of the first angled leg of mounting part 13, so that a slight elastic flaring of the groove is still possible even after engagement, as a result of which a significant frictional engagement is present between mounting part 13 and adapter element 12 in addition to the purely positive locking engagement.

FIG. 6 shows a situation similar to FIG. 5. Adapter element 12 is displaced in the direction of arrow A over chain link 10, and laterally projecting pins 14 and 15 of chain link 10 are flush with inclined surfaces 121 on the inside of legs 12i and 12j. If adapter element 12 is now pushed further onto chain link 10, the two legs 12i and 12j are flared progressively due to the projecting pins 14 and 15 being forced against inclined surfaces 121, which in turn exerts increasing pressure on adapter element 12 until a maximum pressure point is reached. This pressure point is then exceeded when the two projecting pins 14 and 15 of chain link 10 engage with the recesses or holes 12k on the inside of legs 12i and 12j, thereby creating a positively fitted connection between adapter element 12 and chain link 10. Here too, it is advantageous if the U-shape consisting of legs 12i and 12j designed to accommodate chain link 10 with its two projecting pins 14 and 15 is dimensioned somewhat smaller than would create an exact form fit, so that here too a friction lock is created between adapter element 12 and chain link 10 in addition to the purely positive locking engagement.

Of course the invention is not limited to the embodiment described. Thus, for example, latching areas might also be conformed at the ends of legs 12i, 12j of adapter element 12, so that after the positively and negatively locking engagement has been established with chain link 10, as retaining clip (not shown) might be applied between the two legs 12i and 12j, with corresponding means of engagement with the ends of the legs, thereby providing additional stabilisation of the U-shaped adapter element 12, thus also ensuring extra protection for the connection between adapter element 12 and chain link 10. In addition, a specially adapted one-piece chain link may be used instead of the locking connection between chain link 10 and adapter element 12, and which may be integrated therewith when the roller chain is assembled.

What is claimed is:

1. A chain transporter system comprising
a plurality of sequentially arranged contiguous chain links;
a plurality of adapter elements, each said adapter element being attached to at least one of said chain links via a latching connection and including a groove-type recess in an upper part thereof having a pair of opposed walls, a first undercut in one of said walls and a second undercut in the other of said walls; and
a plurality of mounting parts, each said mounting part being disengageably received in said recess a respective one of said adapter elements and including a first extension matingly received in said first undercut of a respective one of said adapter elements and a second extension matingly received in said second undercut of said one adapter element.

2. A chain transporter system as set forth in claim 1 wherein each said adapter element is positioned over an upper surface of a respective one of said chain links.

3. A chain transporter system as set forth in claim 1 wherein each said mounting part is snap-fitted into said groove-type recess of a respective one of said adapter elements.

4. A chain transporter system as set forth in claim 1 where each said adapter element is elastically deformable relative to a respective one of said mounting parts mounted therein.

5. A chain transporter system as set forth in claim 1 wherein at least one of said adapter elements is mounted on a plurality of said chain links.

6. A chain transporter system as set forth in claim 1 wherein at least one of said mounting parts is an angle element having a first leg received in said groove-type recess of a respective one of said adapter elements and a second leg extending at an angle from said first leg.

7. A chain transporter system as set forth in claim 1 wherein each said adapter element is elastically deformable and each said mounting part is made of aluminum.

8. A chain transporter system comprising
a plurality of sequentially arranged contiguous and interconnected chain links,
a plurality of adaptor elements, each said adapter element being snap-fitted onto an upper surface of a respective one of said chain links and positioned over an upper surface of a respective one of said chain inks, each said adapter element including a groove-type recess in an upper part thereof having a pair of opposed walls, a first undercut in one of said walls and a second undercut in the other of said walls; and
a plurality of mounting parts, each said mounting part being received in said recess of a respective one of said adapter elements and including a first extension matingly received in said first undercut of a respective one of said adapter elements and a second extension matingly received in said second undercut of said one adapter element.

9. A chain transporter system as set forth in claim 8 wherein each said mounting part is snap-fitted into said groove-type recess of a respective one of said adapter elements.

10. A chain transporter system comprising
a plurality of sequentially arranged contiguous chain links;
a plurality of adapter elements, each said adapter element being detachably mounted on at least one of said chain links and including a groove-type recess in an upper part thereof having a pair of opposed walls, a first undercut in one of said walls and a second undercut in the other of said walls; and
a plurality of mounting parts, each said mounting part being disengageably received in said recess of a respective one of said adapter elements and including a first extension matingly received in said first undercut of a respective one of said adapter elements and a second extension matingly received in said second undercut of said on adapter element.

11. A chain transporter system comprising
a plurality of sequentially arranged contiguous and interconnected chain links,
a plurality of adapter elements, each said adapter element being attached to an upper surface of a respective one of said chain links and positioned over an upper surface of a respective one of said chain links, each said adapter element including a groove-type recess in an upper part thereof having a pair of opposed Walls, a first undercut in one of said walls and a second undercut in the other of said walls; and
a plurality of mounting parts, each said mounting part being received in said recess of a respective one of said adapter elements and including a first extension matingly received in said first undercut of a respective one of said adapter elements and a second extension matingly received in said second undercut of said one adapter element.
when each said adapter element is attached to at least one of said chain links via a latching connection.

12. A chain transporter system comprising
a plurality of sequentially arranged contiguous and interconnected chain links,
a plurality of adapter elements, each said adapter element being attached to an upper surface of a respective one of said chain links and positioned over an upper surface of a respective one of said chain links, each said adapter element including a groove-type recess in an upper part thereof having a pair of opposed walls, a first undercut in one of said walls and a second undercut in the other of said walls; and
a plurality of mounting parts, each said mounting part being received in said recess of a respective one of said adapter elements and including a first extension matingly received in said first undercut of a respective one of said adapter elements and a second extension matingly received in said second undercut of said one adapter element
wherein each said adapter element is detachably mounted on at least one of said chain links.

* * * * *

UNITED STATES PATENT AND TRADEMARK OFFICE
CERTIFICATE OF CORRECTION

PATENT NO.       : 8,430,236 B2
APPLICATION NO.  : 12/931523
DATED            : April 30, 2013
INVENTOR(S)      : Achim Krischer Page 1 of 1

It is certified that error appears in the above-identified patent and that said Letters Patent is hereby corrected as shown below:

In the Claims:

Col. 4, line 59, "recess a" should be --recess of a--

Col. 6, line 15, "Walls" should be --walls--

Signed and Sealed this
Twenty-fifth Day of June, 2013

Teresa Stanek Rea
*Acting Director of the United States Patent and Trademark Office*